United States Patent [19]

Shattuck

[11] 4,004,849
[45] Jan. 25, 1977

[54] DISPLAY APPARATUS AND PROCESS

[75] Inventor: Meredith David Shattuck, San Jose, Calif.

[73] Assignee: International Business Machines Corporation, Armonk, N.Y.

[22] Filed: Dec. 8, 1975

[21] Appl. No.: 638,398

[52] U.S. Cl. .............................. 350/160 R; 252/408
[51] Int. Cl.² .......................................... G02B 5/23
[58] Field of Search ................. 252/408; 350/160 R

[56] References Cited
UNITED STATES PATENTS 3,702,724  11/1972  Land et al. .................... 350/160 R

FOREIGN PATENTS OR APPLICATIONS 1,275,686  5/1972  United Kingdom

*Primary Examiner*—Benjamin R. Padgett
*Assistant Examiner*—E. Suzanne Parr
*Attorney, Agent, or Firm*—Joseph G. Walsh

[57] ABSTRACT

An apparatus and a process for displaying a visible image are disclosed. A solution in liquid of at least two types of polymeric materials contained between two electrodes, at least one of which is transparent, is subjected to imagewise electrical voltage. The polymers comprise cellulose nitrate, polyester, polyvinylcarbazole, and formaldehyde condensation polymers.

10 Claims, No Drawings

DISPLAY APPARATUS AND PROCESS

FIELD OF THE INVENTION

The present invention is concerned with an apparatus for displaying a visible image and with a process for so doing. In particular, it is concerned with the use in such an apparatus and process of mixtures containing cellulose nitrate, polyester, polyvinylcarbazole, and formaldehyde condensation polymers.

PRIOR ART

There are many various types of apparatus and processes for displaying images. Many such prior art devices involve the use of liquid crystals. The present invention, however, is clearly distinguishable from any liquid crystal work in that the present invention involves solutions in liquid medium. In the case of liquid crystals, there is no liquid medium involved. Still an additional difference between the present process and one involving liquid crystals is that in the case of liquid crystals, information is displayed by using changes in the anisotropic properties of liquid crystals while in the present invention it is believed that the operation does not depend upon changes in isotropy.

The art also teaches the phenomenon of electrical birefringerence, as shown for example, in Compte Rendu, 257, 1288 (1963). In the phenomenon of electrical birefringence polymer molecules, under the influence of an electrical field, are formed into microcrystallites or micellar suspensions which scatter light. The present invention, however, is clearly distinguished from the phenomenon of electrical birefringence since, although it cannot be said with certainty what the mechanism of the present invention is, it appears to depend on the use of two different polymers simultaneously and it does not appear that, like electrical birefringence, it depends upon the influence of an electrical field alone.

SUMMARY OF THE INVENTION

The present invention provides an apparatus and a process for displaying a visible image. The apparatus comprises two substantially parallel planar electrodes, at least one of which is transparent. Contained between these electrodes is a solution in liquid of a polymeric composition. This polymeric composition should contain at least two polymers at least one of which is selected from the group consisting of cellulose nitrate, polyester, polyvinylcarbazole, and formaldehyde condensation polymers.

The solution of polymers in liquid is, in the process of the present invention, subjected to the application of electrical voltage in an imagewise manner. There are at least two ways in which a voltage may be applied in an imagewise manner. In one way, the polymeric material is photoconductive, and it is subjected to an imagewise exposure to light. Only at those portions where exposure to light was taken place does a change in appearance of the polymeric composition take place.

It is, however, not essential for the purpose of the present invention that the polymeric composition be photoconductive. Non-photoconductive polymers can also be used. When such a non-photoconductive polymer system is used, the imagewise application of voltage can be accomplished by means of matrix addressing. The use of such a matrix addressing device is well known in the art.

Cellulose nitrate, polyester, polyvinylcarbazole, and formaldehyde condensation polymers are useful in the present invention. The term polymer is used here to include copolymers and terpolymers. In particular, cellulose nitrate may be mixed with other polymers, including both photoconductive and non-photoconductive polymers, such as:

a. polymethylene-N-ethyl carbazole polymer;
b. 3-vinyl-10-methyl phenothiazine polymer;
c. sytrene copolymerized with 2-vinyl pyridine;
d. dibenzothiophene condensation polymer with formaldehyde;
e. 1-vinyl naphthalene polymer;
f. formaldehyde condensation polymer with dibenzothiophene and dibenzofuran;
g. polyvinylcarbazole;
h. polyester such as Vitel PE222;
i. polystyrene.

In like manner, formaldehyde condensation polymers, polyvinylcarbazole and polyesters may also be mixed with each other and with other polymers.

The choice of optimum liquid solvent will depend upon the particular polymers being used. Typical useful liquids include, for example, tetrahydrofuran (THF), methyl ethyl ketone (MEK), acetone, dimethylformamide (DMF), and mixtures of these.

Glass is a preferred material for use as an electrode, provided it has been rendered conductive to electricity, for example, by coating it with a conductor. NESA glass, which is glass coated with tin oxide, is particularly preferred, since it is very conductive and also very transparent. Two sheets of NESA glass are a preferred example of two planar, substantially parallel electrodes. Other materials useful to coat glass electrodes include indium oxide, and thin metallic layers of platinum, gold or aluminum.

As mentiond above, the operation of the present invention, unlike the phenomenon of electrical birefringence, is not believed to depend upon an electrical field effect. This has been proved by a simple experiment in which a thin dielectric has been placed between the electrodes. If the process is dependent upon field effect, it should operate even in the presence of the dielectric. The present process does not operate under such conditions, however, It is believed that the change in appearance of the suspended polymers occurs when, and only when, the applied voltage exceeds a certain minimum threshold. This threshold appears to vary from about 2 volts in some cases up to about 15 volts in other cases. The usual range is from about 4 to about 8 volts. It is believed that in those instances where photoconductive polymers are used in conjunction with exposure to light, the resistivity of the suspension is lowered in those areas exposed to light, and the threshold is exceeded only in those areas. In a similar manner, when a matrix addressing is used, the potentials of the individual electrodes are chosen so that the threshold is exceeded only at selected places where the electrodes cross over each other. The existence of a threshold insures that only the desired crosspoints will be activated.

Without wishing to impose any limitation on the scope of the invention, the following is proposed as a possible mechanism for the present invention. In every case where voltage induced scattering is observed, the unexcited polymer solution has an opalescent appearance of varying degrees. Voltage induced scattering in completely transparent clear solutions has not been observed. Each polymer in the combination of polymers may be soluble in the solvent. When the polymers are added together, however, they form a slightly immiscible emulsion giving the "solution" an opalescent appearance.

When the solution is added to the cell, the respective polymers may assume a configuration as follows:

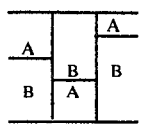

where A and B are different polymers in the same solvent. There may be some intermixing of the two polymers A and B, giving the solution a frosty appearance.

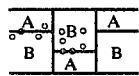

When a voltage is applied, the polymers A and B migrate to separate electrodes

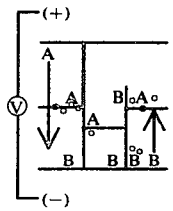

The first observed effect is that of scattering or increased opacity as the polymers A and B intermix. However, with continued application of voltage a sheet of A and a sheet of B is formed on their respective electrodes.

| B | B | B |
|---|---|---|
| A | A | A | and the result is a clear or transparent cell since intermixing is minimal.

In order to maximize scattering or intermixing, the polarity would have to be constantly switched. This explanation is consistent with the results obtained under various conditions, i.e. at first the cell produces scattering when voltage is applied. As the voltage is left on the cell eventually clears and remains mostly clear as long as the voltage is on. When the potential is reversed, the cell again becomes scattering and then clears.

In the case of the formaldehyde condensation polymers, it is believed that the polymers contain different molecular weight fractions, which have different solubility characteristics, so that in effect two phases are obtained. This also is consistent with the observation that the formaldehyde condensation polymers form 2 liquid layers on standing, with one of the layers having an oil like appearance.

The following examples are given solely for purposes of illustration and are not to be considered limitations on the invention, many variations of which are possible without departing from the spirit or scope thereof.

EXAMPLE I

A composition containing one part 3-vinyl-10-methyl phenothiazine polymer and one part cellulose nitrate resin was added to 20 parts tetrahydrofuran solvent. A viscous opalescent appearing solution was obtained. The solution was placed in a thin cell consisting of two glass plates each coated with a thin transparent electrically conductive layer of tin oxide. The glass plates, which were separated by a 75 micron Mylar spacer, were arranged in a parallel plate electrode configuration and were connected to a power supply. The solution in the thin cell had a very slightly hazy appearance prior to application of voltage across the cell. When a potential of about 10 volts was applied, a highly scattering opaque layer was obtained. The layer was made clear or transparent by applying a short pulse of voltage opposite in polarity to that used to produce the scattering.

The addition of a small amount of (~10% by weight of total solids) of carbon tetrabromide was used to make the layer beam addressable. That is, the layer contained in the cell could be imaged with light so that the portions of the cell receiving light were clear or transparent and the areas not receiving light were opaque or scattering.

EXAMPLE II

A solution containing 30 percnet dibenzothiophene formaldehyde condensation polymer in methyl ethyl ketone was placed in a matrix cell consisting of a glass plate with 7 horizontal transparent electrically conductive strips of indium oxide, a 25 micron Mylar spacer and another glass plate with 5 vertical conductive strips of indium oxide. (Mylar is duPont's brand of polyethylene terephthalate.) This formed a 5 × 7 matrix which was driven by scanning through the 7 lines one at a time with an applied voltage. The 5 vertical lines had either a select voltage or non-select voltage with reference to the scan line voltage.

For example, the voltage on the scanned line might be 2V and the selected line at $-V$ giving $2V-(-V)$ or 3V at that cross point (where V is a threshold voltage below which no change is observed). This 3:1 matrix scheme was used to drive the cell. At a 3V of 10 volts a 25 micron cell showed characters with fairly good scattering density in the character area. A 75 micron cell driven at a 3V of 12 volts showed characters with good contrast (opaque in the cross point areas clear in the background areas).

EXAMPLE III

Dibenzothiophene formaldehyde condensation polymer (30 parts) was added to methyl ethyl ketone (70 parts) and was placed between conductive tin oxide coated glass plates separated by a 37 micron Mylar spacer. A potential of 2 volts was applied across the cell. No scattering or change in appearance was observed. The voltage was increased to 4 volts. Again no scattering was observed. When 6 volts were applied the cell was driven to an opaque light scattering state. This demonstrates a threshold effect or point below which no change is observed.

EXAMPLE IV

A solution containing 30% by weight of dibenzothiophene formaldehyde condensation polymer in methyl ethyl ketone was placed between transparent conductive tin oxide coated glass plates. The glass plates were separated by a 37 micron Mylar spacer. A 25 volt potential was placed across the cell and the cell was simultaneously exposed to a pattern of ultraviolet light. The areas of the cell receiving the ultraviolet light became opaque or light scattering while the background areas were clear. The image was erased by reversing the polarity of the applied voltage.

EXAMPLE V

A cell was constructed of a pair of electrically conductive tin oxide coated glass plates arranged parallel. The plates were separated by a 12 micron Mylar spacer. A composition of 5 parts dibenzothiophene-dibenzofuran formaldehyde terpolymer, 5 parts methyl ethyl ketone and 2 parts acetone was added to the space between the conductive electrodes. A potential of 2 volts applied across the cell was insufficient to produce scattering. Very slight scattering was observed at 4 volts while very good scattering was observed with 6 volts.

EXAMPLE VI

A terpolymer of dibenzothiophene dibenzofuran formaldehyde was added to dimethylformamide at a ratio of 3 parts polymer to 7 parts solvent. The solution was added to a cell constructed as in Example V. A potential up to 4 volts was insufficient to produce scattering. Slight scattering was observed with 6 volts, and good scattering with 8 volts applied across the cell.

EXAMPLE VII

A solution of 2 parts cellulose nitrate, 5 parts sytrene-2-vinyl pyridine copolymer, 14 parts tetrahydrofuran and 14 parts methyl ethyl ketone was placed in a cell constructed as described in Example III. The solution was driven to a scattering state with the application of 20V. The solution was cleared by applying voltage opposite in polarity.

EXAMPLE VIII

A solution of 2 parts cellulose nitrate, 5 parts 1-vinyl naphthalene and 28 parts methyl ethyl ketone was added to a cell as in Example VII. Weak scattering was produced when a potential of 20 volts was used to drive the cell.

EXAMPLE IX

One part cellulose nitrate, 6 parts dibenzothiophene dibenzofuran formaldehyde terpolymer and 28 parts methyl ethyl ketone was added to a cell as in Example III. The cell was driven to a scattering state by application of 20 volts.

EXAMPLE X

Two parts polyvinylcarbazole, 1 part cellulose nitrate and 27 parts tetrahydrofuran were added to a cell as in Example III. The cell was driven to a scattering state by application of 15 volts.

EXAMPLE XI

A solution consisting of 1 part Vitel PE222 (a linear saturated polyester polymer from the Goodyear Tire and Rubber Co.) and 2 parts polyvinylcarbazole in tetrahydrofuran (12% solids by weight) were added to a cell. The cell consisted of parallel conductive coated glass plates separated by a 19 micron Mylar spacer. The cell was driven to a scattering state by the application of 30 volts. The cell was cleared by reversing the polarity of applied voltage.

EXAMPLE XII

A composition containing 3 parts polyvinyl carbazole, 1 part cellulose nitrate, .03 parts 1',3',3'-trimethyl-6-nitrospiro [2H-1-benzopyran-2,2'-indoline, and 40 parts tetrahydrofuran was added to a cell of transparent tin oxide coated glass plates separated by a 19 micron Mylar spacer. A 15 volt potential was applied across the cell while the cell was exposed to a pattern of light. The background areas were transparent or clear, while the exposed areas had a frosty or scattering appearance. The image was erased by reversing the polarity and the process was repeated again producing an image in the form of clear and scattering areas.

What is claimed is:

1. An apparatus for displaying a visible image, said apparatus comprising two substantially parallel planar electrodes at least one of which is transparent, and, contained between said electrodes, a solution in liquid of at least two polymers, at least one of which is selected from the group consisting of cellulose nitrate, polyester, polyvinylcarbazole and formaldehyde condensation polymers with the other polymer being selected from the group consisting of polymethylene-N-ethyl carbazole polymer, 3-vinyl-10-methyl phenothiazine polymer, styrene copolymerized with 2-vinyl pyridine, dibenzothiophene condensation polymer with formaldehyde, 1-vinyl naphthalene polymer, formaldehyde condensation polymer with dibenzothiophene and dibenzofuran, polyvinylcarbazole, polyester and polystyrene, and with the liquid being selected from the group consisting of tetrahydrofuran, methyl ethyl ketone, acetone, dimethyl formamide and mixtures thereof.

2. An apparatus as claimed in claim 1 wherein a polymer is photoconductive.

3. An apparatus as claimed in claim 1 wherein the transparent electrode is glass coated with tin oxide.

4. An apparatus as claimed in claim 1 wherein a polymer is cellulose nitrate.

5. An apparatus as claimed in claim 1 wherein a polymer is a formaldehyde condensation polymer.

6. A process for forming a visible display image, said process comprising applying an electrical voltage to a solution in liquid of a mixture of at least two polymers at least one of which is selected from the group consisting of cellulose nitrate, polyester, polyvinylcarbazole, and formaldehyde condensation polymers, with the other polymer being selected from the group consisting of polymethylene-N-ethyl carbazole polymer, 3-vinyl-10-methyl phenothiazine polymer, styrene copolymerized with 2-vinyl pyridine, dibenzothiophene condensation polymer with formaldehyde, 1-vinyl naphthalene polymer, formaldehyde condensation polymer with dibenzothiophene and dibenzofuran, polyvinylcarbazole, polyester and polystyrene, and with the liquid being selected from the group consisting of tetrahydrofuran, methyl ethyl ketone, acetone, dimethyl formamide and mixtures thereof, said voltage being applied in an imagewise manner to the polymer solution contained between two substantially parallel planar electrodes, at least one of which is transparent.

7. A process as claimed in claim 6 wherein a polymer is photoconductive and exposed to light in an imagewise manner simultaneously with the application of the electrical voltage.

8. A process as claimed in claim 6 wherein the voltage is applied in an imagewise manner by means of matrix addressing.

9. A process as claimed in claim 6 wherein a polymer is cellulose nitrate.

10. A process as claimed in claim 6 wherein a polymer is a formaldehyde condensation polymer.

* * * * *